SYNTHESIZED NETWORK FOR SIGNAL TRANSMISSION

Filed Feb. 18, 1971

INVENTOR
TAKUYA IWAKAMI

BY Sughrue, Rothwell, Mion, Zinn & Macpeak
ATTORNEYS

United States Patent Office 3,706,053
Patented Dec. 12, 1972

3,706,053

SYNTHESIZED NETWORK FOR SIGNAL TRANSMISSION

Takuya Iwakami, Tokyo, Japan, assignor to Nippon Electric Company, Limited, Tokyo, Japan Filed Feb. 18, 1971, Ser. No. 116,360
Claims priority, application Japan, Feb. 21, 1970, 45/14,891
Int. Cl. H04b 3/40
U.S. Cl. 333—23 4 Claims

ABSTRACT OF THE DISCLOSURE

A synthesized network is formed equivalent to a coaxial cable of any desired length using distributed RC networks of finite length constructed by integrated circuit techniques. A symmetrical network having two input and two output ports includes a first pair of uniformly distributed RC elements in series branches of the symmetrical circuit and a second pair of uniformly distributed RC elements in parallel branches. The first and second pairs of uniformly distributed elements are of substantially identical length with each of the first pair having a pair of terminals short circuited and each of the second pair having a pair of terminals open circuited. A third uniformly distributed RC element is connected to the output terminals of said symmetrical circuit and has a driving point impedance substantially equal to the image impedance of said symmetrical network. The synthesized network is equivalent to a coaxial cable of length L and having a coaxial cable constant K where the total resistance $R_T$ and capacitance $C_T$ of each of said first and second uniformly distributed RC networks satisfy the condition $$R_T C_T = \left(\frac{KL}{2}\right)^2$$

This invention relates to a synthesized network for signal transmission and, more particularly, to a transmission network of this kind for use as dummy transmission lines at repeaters in a coaxial-cable-type carrier transmission system.

Generally, in a coaxial-cable-type carrier transmission system, the spatial intervals between every two adjacent repeater stations slightly vary from one place to another depending essentially on the physical conditions encountered at the time of installing the cables. It is, therefore, the practice in this technical field, to employ several synthesized dummy networks of transmission characteristics identical to those of the coaxial lines and of different lengths, in appropriate combinations with the coaxial lines, so as to substantially equalize the repeater intervals in electrical lengths. Such synthesized network is usually composed of a constant-resistance-attenuation equalizer coupled with the transmission line in the manner as described in the article entitled "Basic and Regulating Repeaters" by J. E. Carrison et al. (BSTJ, vol. 48, No. 4, April 1969, pp. 841–889, particularly p. 861. The constant-resistance-attenuation equalizers are advantageous in the following respects: (1) The equalizers can be connected in cascade; (2) the synthesized dummy network can be formed as a minimum phase circuit; and (3) deviations of the circuit constants result in rather small change of attenuation characteristics of the equalizers. On the other hand, such network as employs the constant-resistance-attenuation equalizers gives rise to several drawbacks. Stated more specifically, the proximity band with respect to the attenuation characteristic (or the so-called $\sqrt{f}$ characteristic showing the attenuation value in decibels proportional to the square root of the frequency) is limited to 2 to 3 decades at best. Also, a proximity deviation is unavoidable in the proximity band and causes waveform distortion. Moreover, an effective approximately method is not developed yet and so it is difficult to design the synthesized network accurately. In addition, the design of such network must be modified in response to the length of the line to be approximated. Dead loss, too many equalizer stages needed for accurate approximation and difficulty in applying the integrated circuit technique to manufacture of the synthesized network are also problems.

An object of this invention is therefore to provide a synthesized network for the dummy transmission line use which is free from any of those disadvantages of the conventional devices.

The network of this invention is based on an entirely novel concept. It utilizes uniformly distributed RC networks of finite lengths, with their terminals shorted or opened. The voltage transfer function of the subject dummy transmission line has an accurate $\sqrt{f}$ characteristic within a certain frequency band, because of the characteristics inherent in the driving point impedance of the uniformly distributed RC network. The length of the present network can be changed simply by changing the lengths of the distributed RC networks in terms of the simple proportional relationship.

The invention will be better understood from the following description taken in connection with the accompanying drawings.

FIG. 2(*b*) is an equivalent circuit of the element of FIG. 2(*a*); and

Figure 2A:
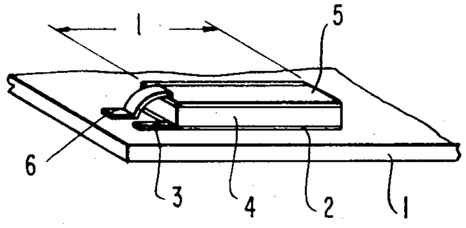
FIG. 2(*a*) is a perspective view of the principal elements of a uniformly distributed RC network.
Figure 2B:
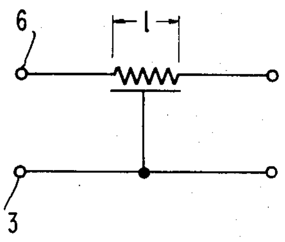
Figure 3A:
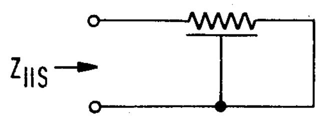
Figure 3B:
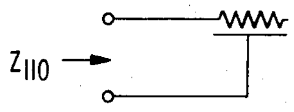

FIGS. 3 (*a*) and (*b*) show circuit diagrams of the device of FIG. 2(*a*) in preferred circuit connections.

Figure 1:
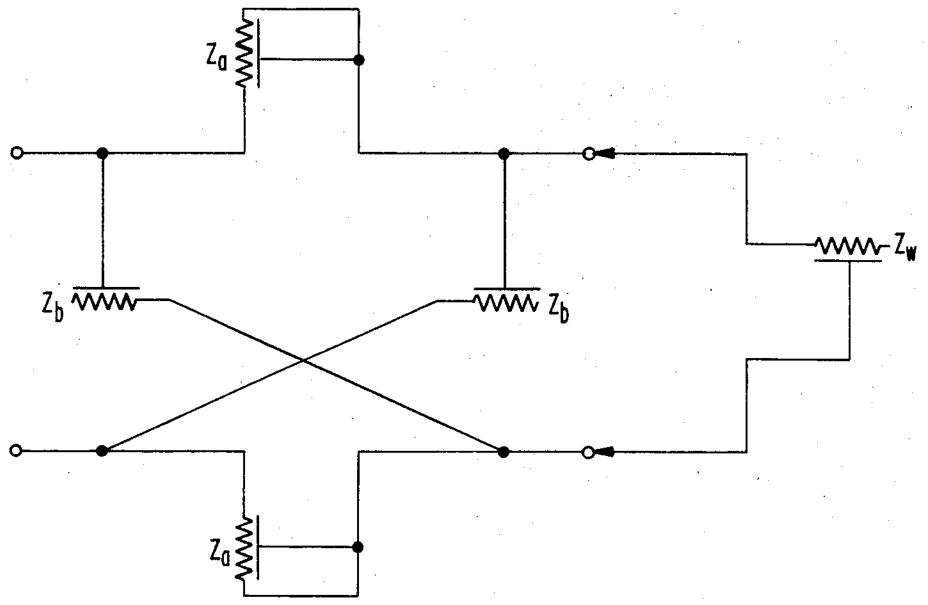
FIG. 1 is a circuit diagram showing the principal elements of the dummy network embodying this invention.
Figure 4:
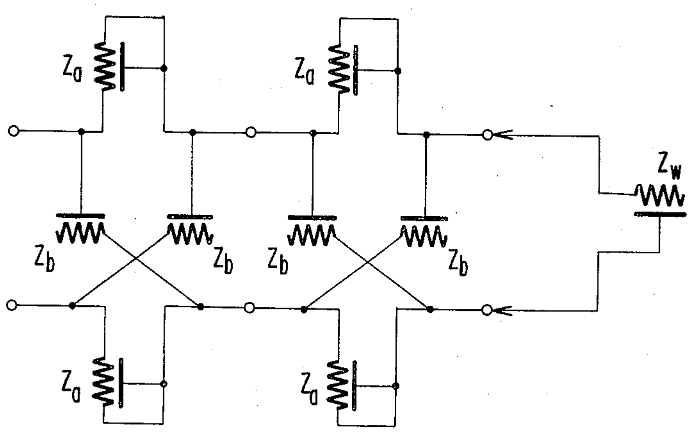

FIG. 4 is a circuit using plural networks of the type shown in FIG. 1.

Referring to FIG. 1, the references $Z_a$, $Z_b$ and $Z_w$ denote circuit elements each having a uniformly distributed RC network of a finite length. An example of such RC network is shown in FIG. 2(*a*). The device is formed by evaporating conductor 2 over the surface of a base plate 1 made of ceramic or the like, attaching lead terminal 3 to the conductor 2, evaporating dielectric material 4 over the conductor 2, further evaporating resistance element 5 over the dielectric material 4, and then attaching a lead terminal 6 to the resistance element 5.

Referring again to FIG. 1, the element $Z_a$ represents the RC network shown in the equivalent circuit of FIG. 2(*b*) with its pair of terminals short-circuited, and each of $Z_b$ and $Z_w$ denotes the RC line with its pair of terminals opened. Detailed description of the characteristic of the driving point impedance of the uniformly distributed RC network is given in the article entitled "Synthesis of RC Transmission Networks Containing Distributed RC Lines" by T. Suezaki, S. Takahashi and T. Iwakami (Journal of Electronics and Communication in Japan, vol. 51–A, No. 9, 1969, pp. 9–18). According to this paper, the driving point impedance seen from the terminals 3 and 6 in FIG. 2(*b*) is expressed, for the case where the pair of terminals are short-circuited as shown in FIG. 3(*a*), by $$Z_{11s}=\sqrt{\frac{r_o}{c_o}}\cdot\frac{1}{\sqrt{S}}\tanh\sqrt{r_oc_oS}\,l=\sqrt{\frac{r_T}{c_T}}\cdot\frac{1}{\sqrt{S}}\tanh\sqrt{r_Tc_TS} \tag{1}$$

and, for the case where the pair of terminals are opened as shown in FIG. 3(*b*) by $$Z_{11o}=\sqrt{\frac{r_o}{c_o}}\cdot\frac{1}{\sqrt{S}}\coth\sqrt{r_oc_oS}\,l=\sqrt{\frac{r_T}{c_T}}\cdot\frac{1}{\sqrt{S}}\coth\sqrt{r_Tc_TS} \tag{2}$$

where $l$ stands for length of the distributed RC line; $r_o$, distributed resistance per unit length; $c_o$ distributed capacitance per unit length; $r_T$ total resistance i.e. $(r_o\times l)$; $c_T$, total capacitance, i.e., $(c_o\times l)$; S, complex angular frequency.

If S is given by $j\omega$ and $\omega$ satisfies the relationship $$\omega\geqq 10/r_Tc_T \tag{3}$$

Equations 1 and 2 can be rewritten as $$Z_{11o}, Z_{11s}=\sqrt{\frac{r_o}{c_o}}\cdot\frac{1}{\sqrt{S}}=\sqrt{\frac{r_T}{c_T}}\cdot\frac{1}{\sqrt{S}} \tag{4}$$

The deviation in Equation 4 is less than 1% with respect to the amplitude characteristic and phase characteristic, when $\omega=10/r_Tc_T$. The deviation will be further lowered below 1% when the value of is larger than $10/r_Tc_T$. In other words, the phase and amplitude characteristics of the RC line can be accurately approximated by Equation 4 in the frequency range defined by Equation 3.

The driving point impedance of the uniformly distributed RC network can be expressed in three different forms such as Equations 1, 2 and 4, depending on the terminal conditions and the frequency used. The circuit as shown in FIG. 1 comprises in combination three elements corresponding to these impedances. In the circuit of FIG. 1, the driving point impedances of $Z_a$, $Z_b$ and $Z_w$ are determined respectively as follows:

$$Z_{11a}=\sqrt{\frac{R_T}{C_T}}\cdot\frac{1}{\sqrt{S}}\tanh\sqrt{R_TC_TS} \tag{5}$$

$$Z_{11b}=\sqrt{\frac{R_T}{C_T}}\cdot\frac{1}{\sqrt{S}}\coth\sqrt{R_TC_TS} \tag{6}$$

$$Z_{11w}=\sqrt{\frac{R_{Tw}}{C_{Tw}}}\cdot\frac{1}{\sqrt{S}}=\sqrt{\frac{R_T}{C_T}}\cdot\frac{1}{\sqrt{S}} \tag{7}$$

where the following relationship holds $$\frac{R_{Tw}}{C_{Tw}}=\frac{R_T}{C_T} \tag{8}$$

and where $R_T$ stands for total resistance of the elements $Z_a$ and $B_b$; $C_T$, total capictance of elements $Z_a$ and $Z_b$; $R_{TW}$, total resistance of element $Z_w$; and $C_{TW}$, total resistance of element $Z_w$.

In the circuit in FIG. 1, when the driving point impedance of the elements $Z_a$ and $Z_b$ are expressed by Equations 5 and 6 respectively, the image impedance of the symmetrical lattice-type two-port transmission network is given by Equation 7. As a result, when the uniformly distributed RC network with a driving point impedance of $Z_{11w}$ is connected to the output terminals of the symmetrical network, the four-terminal matrix (F matrix) may be expressed as $$F=\begin{pmatrix}AB\\CD\end{pmatrix}$$

$$=\begin{bmatrix}\dfrac{Z_{11b}+Z_{11a}}{Z_{11b}-Z_{11a}} & \dfrac{2Z_{11a}\times Z_{11b}}{Z_{11b}-Z_{11a}}\\[2ex] \dfrac{2}{Z_{11b}-Z_{11a}} & \dfrac{Z_{11b}+Z_{11a}}{Z_{11b}-Z_{11a}}\end{bmatrix}\times\begin{bmatrix}1 & 0\\ 1/Z_{11w} & 1\end{bmatrix}$$

$$=\begin{bmatrix}\dfrac{(Z_{11b}+Z_{11a})Z_{11w}+2Z_{11a}Z_{11b}}{(Z_{11b}-Z_{11a})Z_{11w}} & \dfrac{2Z_{11a}Z_{11b}}{Z_{11b}-Z_{11a}}\\[2ex] \dfrac{2Z_w+Z_{11b}+Z_{11a}}{(Z_{11b}-Z_{11a})Z_{11w}} & \dfrac{Z_{11b}+Z_{11a}}{Z_{11b}-Z_{11a}}\end{bmatrix}$$

The voltage transfer function T(S) is expressed as $$T(S)=1/A=\frac{(Z_{11b}-Z_{11a})Z_{11w}}{(Z_{11b}+Z_{11a})Z_{11w}+2Z_{11a}Z_{11b}}$$

From Equations 5, 6 and 7, $$Z_{11b}=\left(\sqrt{\frac{R_T}{C_T}}\frac{1}{\sqrt{S}}\right)^2/Z_{11a}=Z^2_{11w}/Z_{11a}$$

It follows therefore, $$T(s)=\frac{(Z^2_{11w}/Z_{11a}-Z_{11a})Z_{11w}}{(Z^2_{11w}/Z_{11a}+Z_{11a})Z_{11w}+2Z_{11a}Z^2_{11w}/Z_{11a}}$$

$$=\frac{Z^2_{11w}-Z^2_{11a}}{Z^2_{11w}+Z^2_{11a}+2Z_{11a}Z_{11w}}$$

$$=\frac{Z_{11w}-Z_{11a}}{Z_{11w}+Z_{11a}}$$

$$=\frac{Z_{11w}-Z_{11w}\tanh\sqrt{R_TC_TS}}{Z_{11w}+Z_{11w}\tanh\sqrt{R_TC_TS}}$$

$$=\frac{1-\tanh\sqrt{R_TC_TS}}{1+\tanh\sqrt{R_TC_TS}}$$

$$=\frac{1-\dfrac{\exp\sqrt{R_TC_TS}-\exp(-\sqrt{R_TC_TS})}{\exp\sqrt{R_TC_TS}+\exp(-\sqrt{R_TC_TS})}}{1+\dfrac{\exp\sqrt{R_TC_TS}-\exp(-\sqrt{R_TC_TS})}{\exp\sqrt{R_TC_TS}+\exp(-\sqrt{R_TC_TS})}}$$

$$=\frac{2\exp(-\sqrt{R_TC_TS})}{2\exp\sqrt{R_TC_TS}}$$

$$=\exp(-2\sqrt{R_TC_TS}$$

Therefore, $$T(S)=\frac{Z_{11w}-Z_{11a}}{Z_{11w}+Z_{11a}}=\exp(-2\sqrt{R_TC_TS}) \tag{9}$$

Equation 9 implies the fact that the attenuation characteristic of T(S) takes the form of $\sqrt{f}$ characteristic.

With only the skin effect of a coaxial cable length L takes into consideration and with its leakage conductance neglected, the voltage transfer function $T_c(S)$ is given by the following Equation 10;

$$T_c(S)=\exp(-K\sqrt{SL}) \tag{10}$$

where K is a constant determined by the material of the coaxial cable used, and where the terms of linear phase characteristic are excluded. The introduction of this equation is fully described in the article entitled "Transient Analysis of Coaxial Cables Considering Skin Effect" by R. L. Wigington and N. S. Nahman (Proc. IRE, vol. 45, February 1957, pp. 166–174). In order to form a synthesized network having the same transmission characteristic as the coaxial line as expressed by Equation 10, it is necessary to make Equation 9 coincident with Equation 10. In other words, the relationship should hold:

$$R_T\cdot C_T=\left(\frac{KL}{2}\right)^2 \tag{11}$$

Thus, the attenuation characteristic and phase characteristic of the circuit as shown in FIG. 1 become coincident with those of the coaxial line having propagation constant $K\sqrt{S}$ and length L, at the above-mentioned specific frequency band $$\omega \geqq \frac{10}{r_T c_T}$$

It is well-known that Hilbert transforms are established in the relationship between the amplitude characteristic and phase characteristics of the voltage transfer function expressed by Equation 9 or 10. Hence it can be said that the artificial line as in FIG. 1 is a minimum phase circuit similar to the actual coaxial line. The driving point impedance of the circuit of FIG. 1 is $Z_{11w}$, and the value of the impedance varies depending on change in the frequency, although the characteristic impedance of the coaxial line is purely resistive. Only in this respect, the synthesized network is different from the actual coaxial line. In addition, the circuit as in FIG. 1 is a symmetrical circuit of image impedance $Z_{11W}$ when the terminal element $Z_W$ is removed. Accordingly, by connecting in cascade an arbitrary number of networks as shown in FIG. 1 excluding the element $Z_w$, a synthesized symmetrical network with a voltage transfer function equal to the multiplied value of all the voltage transfer functions of the above-mentioned number of networks can be obtained. An example is shown in FIG. 4.

The constants of elements which constitute the synthesized network are determined in the following manner when arbitrary values of K and L of coaxial line and the minimum frequency $f_c$ are given. First, the value of $R_T.C_T$ is determined by Equation 11. The individual values of $R_T$ and $C_T$ can arbitrarily be determined. Practically, the values of $R_T$ and $C_T$ are determined when the value of $$\sqrt{R_{TW}/C_{TW}}\ (=\sqrt{R_T/C_T})$$

which is the coefficient of the driving point impedance $Z_{11W}$ of the artificial line is determined. It is desirable that the value of $\sqrt{R_{TW}/C_{TW}}$ is determined to be sufficiently larger than the value of characteristic impedance of the coaxial line and to be sufficiently smaller than the value of the input impedance of the amplifier connected to the stage following the synthesized network. The individual values of $R_{TW}$ and $C_{TW}$ are determined according to the minimum frequency $f_c$. Namely, from Equation 3, $$R_{TW}C_{TW} = 10/2\pi f_c \qquad (12)$$

Concrete examples of values of the elements as in FIG. 1 will be shown below. A 0.375 inch coaxial cable of a length of 500 m. is considered. Then, $$K = 1.53\times10^{-7}\ (\text{rad/sec.})^{-0.5}\text{m.}^{-1} \qquad (13)$$

$$L = 500\ \text{m.} \qquad (14)$$

Although the value of $|Z_{11W}|$ can be selected arbitrarily, this value should be sufficiently larger than the inner impedance (for example, 2Ω, const.) of the driving circuit for this network, within the frequency bandwidth used, and at the same time sufficiently smaller than the input impedance of amplifiers (for example, 20KΩ) inserted between those networks.

For example, when $f_c$=1 mHz., and $|Z_{11W}|$=1KΩ at 1 mHz., $$f_c = 1\times10^6\ \text{Hz.} \qquad (15)$$

$$Z_{11w} = \sqrt{\frac{R_{TW}}{C_{TW}}}\cdot\frac{1}{\sqrt{2\pi\times1\times10^6}} = 1\times10^3\Omega \qquad (16)$$

Applying Equation 13 or 16 to Equations 11, 12, 8 and 14, $$R_T = 95.9\Omega,\ C_T = 15.3\ \text{pf.},\ R_{TW} = 3{,}160\Omega,\ C_{TW} = 503\ \text{pf.}$$

The frequency at which this synthesized network can be used without causing deviation is more than 1 mHz.

An impedance of 20KΩ (much greater than 1KΩ) will suffice for the driving point impedance of the amplifier. The length L of the synthesized network can be changed by changing the values of $R_T$ and $C_T$ in proportion to the change in the length L. For example, the values of $R_T$ and $C_T$ are doubled (or reduced to half) when distance L is to be doubled (or reduced to half). In practice, it is sufficient that only the length of the line be changed, and it is not necessary to change the values of $R_{TW}$ and $C_{TW}$.

According to this invention, as has been described, a synthesized network for the coaxial line having arbitrary characteristics (K and L) can readily and accurately be formed only of uniformly distributed RC networks. The features of the invention will be summarized as follows:

(1) Theoretically, there is no deviation as far as the characteristics of the coaxial line can be expressed by Equation 10 and the frequency used can satisfy the requirement of Equation 12;

(2) The applicable frequency band can be arbitrarily determined. More specifically, there is no upper limit of the frequency band, and the lower limit $f_c$ can be arbitrarily lowered if the value of $R_{TW}.C_{TW}$ is increased;

(3) The problem of dead loss is avoided;

(4) Cascade synthesis connection is possible;

(5) The synthesized network is of minimum phase circuit;

(6) Since the synthesized network can be constituted of only uniformly distributed RC networks, the integrated circuit techniques are easily applicable, making it possible to miniaturize the synthesized network as a whole;

(7) A synthesized network equivalent to a long coaxial line can be easily manufactured by the use of small number of elements; and (8) The synthesized network of this invention can be easily formed without resorting to complicated approximation approach. Its length can be proportionally changed simply by changing the lengths of elements $Z_a$ and $Z_b$.

In the foregoing embodiment, each element is composed of a uniformly distributed RC network. In this circuit, the driving point impedance of uniformly distributed RC line can be approximated by a lumped constant RC one-port network in a limited frequency band. For example, according to the foregoing data cited from the above-mentioned T. Suezaki et al. article, the driving point impedance $Z_{11W}$ can be approximated by a simple Foster RC network in a certain limited frequency band. The Foster RC circuit is described in the article entitled "Introduction to Distributed-Parameter Networks" by Mohammed S. Ghausi and John J. Kelly; Holt, Rinehart and Winston Inc., 1968, pp. 194–195.

What is claimed is:

1. A synthesized network equivalent to a signal transmission coaxial cable comprising: a symmetrical lattice-type two-port transmission network having a pair of first uniformly distributed RC networks of a finite length forming a pair of impedance elements of the symmetrical network series branches and a pair of second uniformly distributed RC networks of substantially the same length as said first RC networks forming a pair of impedance elements of the symmetrical network parallel branches, a pair of terminals of each of one pair of said pairs of first and second uniformly distributed RC networks being shorted, and a pair of terminals of each of the other pair of said first and second uniformly distributed RC networks being opened; and a third uniformly distributed RC network of a finite length connected across the output side ports of said symmetrical lattice two-port transmission network, said third RC network having a driving point impedance approximately equal to the image impedance of said symmetrical lattice two-port transmission network, the total resistance $R_T$ and total capacitance $C_T$ of each of said first pair of uniformly distributed RC networks being equal, respectively, to the total resistance and total capacitance of said second pair of uniformly distributed RC networks, and satisfying the conditions, $$R_T/C_T = R_{TW}/C_{TW},$$
$$R_T C_T = (KL/2)^2$$

and $$R_{TW} C_{TW} = 10/2\pi f_c$$

where $R_{TW}$ is the total resistance, $C_{TW}$ is the total capacitance of said third RC network, K is a constant determined by the material of said coaxial cable, L is a lengtth of said coaxial cable, and $f_c$ is a minimum frequency to be transmitted via said coaxial cable.

2. A synthesized network is claimed in claim 1 further including at least one other symmetrical lattice-type two-port transmission network, substantially identical to the first said symmetrical network and connected to the input terminal pair of said first symmetrical network.

3. A synthesized network as claimed in claim 1 wherein each of said uniformly distributed RC networks is a thin film integrated circuit device comprising a metallic layer, a dielectric layer overlying said metallic layer, and a resistive material layer overlying said dielectric layer.

4. A synthesized network as claimed in claim 3 wherein said symmetrical lattice-type network including said pairs of first and second RC network integrated circuit devices comprises, first and second input terminals and first and second output terminals, one end of said resistive layer of one of said first pair of RC elements being connected to said first input terminal, the other end of said resistive layer of said one RC element being connected to said metallic layer of said one RC element, said last mentioned metallic layer also being connected to said first output terminal, said first input terminal also being connected to the metallic layer of one of said second pair of RC elements, the resistive layer of said one second RC element having one end thereof connected to said second output terminal.

References Cited

UNITED STATES PATENTS

| | | | |
|---|---|---|---|
| 3,603,900 | 9/1971 | Hatori | 333—70 CR X |
| 1,590,252 | 6/1926 | Osborne | 333—23 |
| 3,443,311 | 5/1969 | Worobey | 333—70 CR X |

PAUL L. GENSLER, Primary Examiner

U.S. Cl. X.R.

333—70 CR, 74

UNITED STATES PATENT OFFICE
CERTIFICATE OF CORRECTION

Patent No. 3,706,053 Dated December 12, 1972

Inventor(s) Takuya Iwakami

It is certified that error appears in the above-identified patent and that said Letters Patent are hereby corrected as shown below:

In The Specification

Col. 1 Line 58
Delete "J. E. Carrison et al" and insert --J. L. Carrison et al--

Col. 2 Line 9
Delete "approximately" and insert--approximating--

Col. 3 Line 20
Delete "($r_o$ x 1; $c_T$" and insert--($r_o$ x $\underline{1}$); $c_T$--

Col. 3 Line 66
Delete "$B_b$" and insert--$Z_b$--

Col. 3 Line 66
Delete "capictance" and insert--capacitance--

Col. 4 Line 55
Insert--of--after cable

Col. 4 Line 56
Delete "takes" and insert--taken--

UNITED STATES PATENT OFFICE

CERTIFICATE OF CORRECTION

Patent No. 3,706,053 Dated December 12, 1972

Inventor(s) Takuya Iwakami PAGE 2

It is certified that error appears in the above-identified patent and that said Letters Patent are hereby corrected as shown below:

In the Specification

Col. 5 Line 11
Delete "charateristics" and insert--characteristic--

Col 7 Line 14
Delete "is" insert--as--

Signed and sealed this 20th day of November 1973.

(SEAL)
Attest:

EDWARD M.FLETCHER,JR.
Attesting Officer

RENE D. TEGTMEYER
Acting Commissioner of Patents